(12) United States Patent
Nakano et al.

(10) Patent No.: US 7,397,419 B2
(45) Date of Patent: Jul. 8, 2008

(54) RADAR APPARATUS AND FAILURE DETECTION METHOD THEREOF

(75) Inventors: Masao Nakano, Kawasaki (JP); Kenji Oka, Kobe (JP)

(73) Assignees: Fujitsu Ten Limited, Kobe (JP); Fujitsu Limited, Kawasaki (JP)

( * ) Notice: Subject to any disclaimer, the term of this patent is extended or adjusted under 35 U.S.C. 154(b) by 0 days.

(21) Appl. No.: 11/626,627

(22) Filed: Jan. 24, 2007

(65) Prior Publication Data

US 2007/0171123 A1   Jul. 26, 2007

(30) Foreign Application Priority Data

Jan. 25, 2006   (JP) ............................. 2006-016587

(51) Int. Cl.
    *G01S 7/40* (2006.01)
(52) U.S. Cl. .................. 342/173; 342/196; 342/91; 342/92
(58) Field of Classification Search ................ 342/173, 342/196, 91, 92
    See application file for complete search history.

(56) References Cited

U.S. PATENT DOCUMENTS

2005/0128127 A1* 6/2005 Tevs et al. ...................... 342/28
2007/0171123 A1* 7/2007 Nakano et al. ............... 342/173

FOREIGN PATENT DOCUMENTS

| JP | 05-315996   | 11/1993 |
|----|-------------|---------|
| JP | 07-198826   | 8/1995  |
| JP | 10-010227   | 1/1998  |
| JP | 2000-147102 | 5/2000  |
| JP | 2001-116828 | 4/2001  |
| JP | 2001-141805 | 5/2001  |
| JP | 2003-255041 | 9/2003  |
| JP | 2006-003097 | 1/2006  |

* cited by examiner

*Primary Examiner*—Dan Pihulic
(74) *Attorney, Agent, or Firm*—Fogg & Powers LLC (57) ABSTRACT

The present invention provides a radar apparatus, which can diagnose failure at low cost with high accuracy, and a failure diagnosis method thereof. An antenna serves as both a transmit antenna and a receive antenna. A transmit and receive select switch switches the transmission and reception of the antenna. A control unit measures a power value based on an output signal of a receive wave received by the antennas, and judges that the transmit and receive select switch fails when this power value exceeds a threshold.

5 Claims, 6 Drawing Sheets

FIG.1

FIG.2A TRIANGULAR WAVE

FIG.2B ADC 70 (CH0)

FIG.2C ADC 71 (CH1)

RADAR APPARATUS AND FAILURE DETECTION METHOD THEREOF

CROSS-REFERENCE TO RELATED APPLICATIONS

This application is based upon and claims the benefit of priority from the prior Japanese Patent Application No. 2006-16587, filed on Jan. 25, 2006, the entire contents of which are incorporated herein by reference.

BACKGROUND OF THE INVENTION

1. Field of the Invention

The present invention relates to a radar apparatus for measuring the azimuth and other values of a target from a reflected wave which is reflected on the target, and a failure detection method thereof.

2. Description of the Related Art

A Radar apparatus have been used for measuring the azimuth, distance, velocity etc. of a target by outputting a transmit wave from a transmit antenna and receiving a reflected wave, which is reflected on the target, by a receive antenna. For example, a radar apparatus is installed in a vehicle and used for preventing collision with a vehicle in front.

Some such radar apparatus perform failure detection for detecting the failure of each component in the apparatus.

For example, some radar apparatuses intermittently connect a transmit and receive antenna by a switching unit, detecting predetermined frequency components of high frequency signals which propagate in the line of a receive antenna by a detection unit during this connected period, and identifying the abnormality of functions based on this detection result (e.g. Japanese Patent Application Laid-Open No. H7-198826).

Some radar apparatuses install an auxiliary line in a transmit section and receive section respectively, and perform a wrap test, and judge whether the paths in the auxiliary line are normally operating based on the test signal, which is output from the auxiliary line of the receive section (e.g. Japanese Patent Application Laid-Open No. H5-315996).

Some radar apparatuses receive radio waves from a transmit antenna to a receive antenna using spatial coupling, and check the presence of abnormality by comparing the output data of an analysis processing circuit of a receive section and the modulation characteristic of the output of an oscillation circuit of a transmit section using a collation circuit (e.g. Japanese Patent Application Laid-Open No. 2001-116828).

Some radar apparatuses store a level of noise signals near the transmit signals generated where there is no object, and a level of signals of noise, which is output from a mixer for reception when operation of an amplifier for transmission is stopped, and diagnose whether the FMCW radar fails by comparing both levels (e.g. Japanese Patent Application Laid-Open No. 2001-141805).

And other radar apparatuses time-division multiplexes a diagnosis wave having a known signal waveform close to a beat signal with the beat signal, and diagnose the presence of failure of a frequency analysis unit by collating the frequency analysis result of the diagnosis wave with a known signal waveform (e.g. Japanese Patent Application Laid-Open No. H10-10227).

However installing a separate circuit for failure diagnosis, like Japanese Patent Application Laid-Open No. H7-198826, increases the cost of the entire radar apparatus.

Performing failure diagnosis using transmit and receive antennas, as in Japanese Patent Application Laid-Open No. 2001-116828, makes it difficult to detect failure accurately since isolation among antennas is high.

If failure is diagnosed based on the level of a receive signal of a reflected wave, on the other hand, the diagnosis depends on the size of the target, and it is difficult to distinguish the detection of the target from the generation of failure.

SUMMARY OF THE INVENTION

With the foregoing in view, it is an object of the present invention to provide a radar apparatus that can diagnose failure at low cast with high accuracy, and a failure detection method thereof.

To achieve the above object, the present invention is a radar apparatus having a transmit and receive antenna which serves as both a transmit antenna for transmitting a transmit wave into space and a receive antenna for receiving a reflected wave of the transmit wave reflected on a target, having a transmit and receive switching unit which switches transmission and reception of the transmit and receive antenna, and a failure detection unit which judges that the transmit and receive switching unit fails when a power value of a receive signal received by the transmit and receive antenna is greater than a threshold.

Also in the radar apparatus of the present invention, when there are a plurality of transmit and receive antennas, and the transmit and receive switching unit is installed in each of the plurality of transmit and receive antennas, the failure detection unit judges that the transmit and receive switching unit fails when a power value of the receive signal received by one of the transmit and receive antennas is greater than the threshold.

Also the radar apparatus of the present invention further has a gain control unit which controls a gain of the receive signal which is output from the transmit and receive switching unit, between the transmit and receive switching unit and the failure detection unit, wherein the failure detection unit judges that the transmit and receive switching unit fails when a power value of the receive signal of which gain is controlled by the gain control unit is greater than the threshold.

To achieve the above object, the present invention is also a failure detection method in a radar apparatus having a transmit and receive antenna which serves as both a transmit antenna for transmitting a transmit wave into space and a receive antenna for receiving a reflected wave of the transmit wave reflected on a target, the method comprising the step of: judging that a transmit and receive switching unit which switches transmission and reception of the transmission and reception antenna fails when a power value of a receive signal received by the transmit and receive antenna is greater than a threshold.

According to the present invention, a radar apparatus that can diagnose failures at low cost with high accuracy, and a failure detection method thereof can be provided.

DESCRIPTION OF THE PREFERRED EMBODIMENTS

Figure 1:
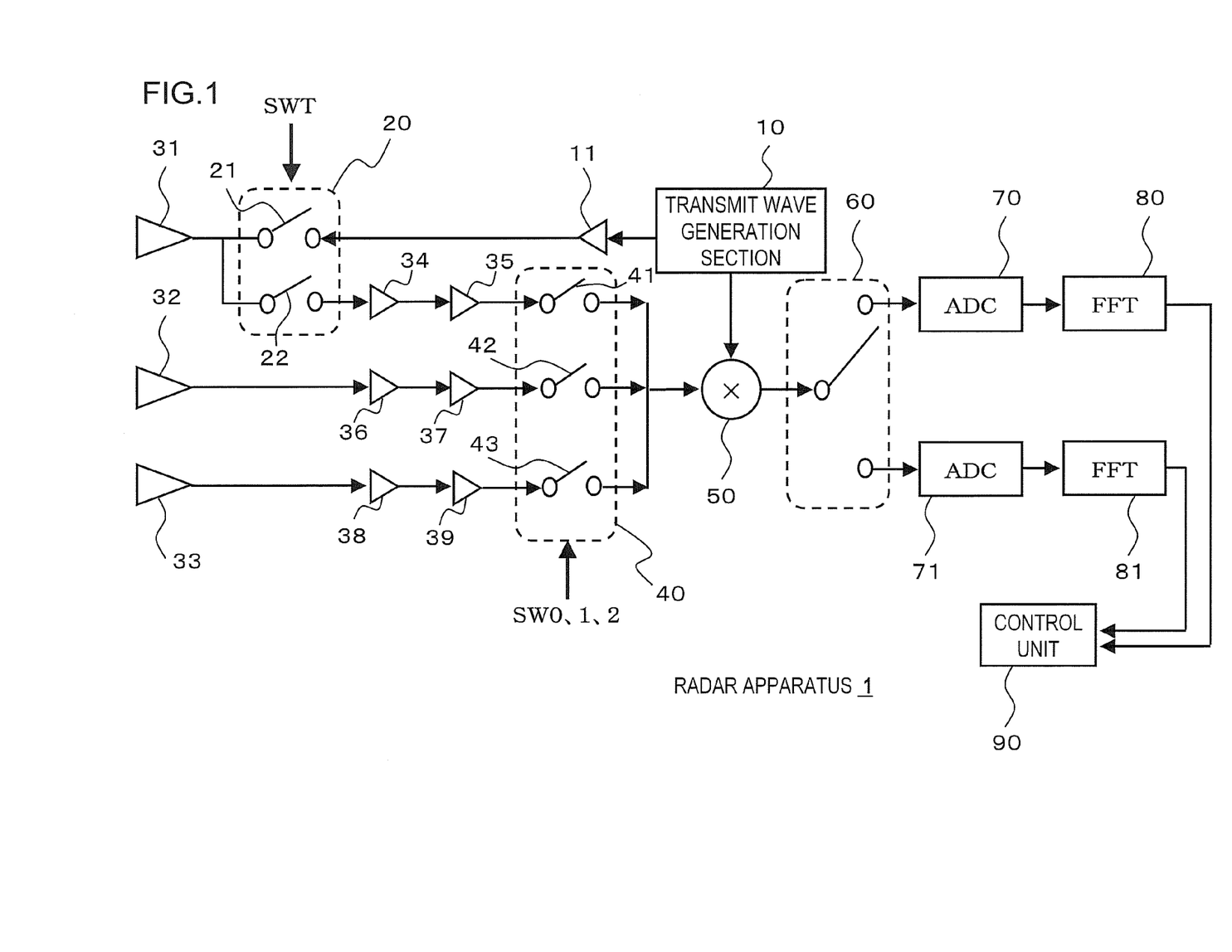
FIG. 1 is a diagram depicting a configuration example of a radar apparatus according to the present invention.

Embodiments of the present invention will now be described with reference to the drawings. FIG. 1 is a diagram depicting a configuration example of a radar apparatus 1 according to the present invention.

The radar apparatus 1 has a transmit wave generation unit 10, a transmit and receive select switch 20, antennas 31, 32 and 33, an antenna select switch 40, a mixer 50, an output select switch 60, first and second analog digital conversion units (ADC) 70 and 71, first and second Fourier transform units (FFT) 80 and 81, and a control unit 90.

The transmit wave generation unit 10 generates a signal for generating a transmit wave which is transmitted from the antenna 31. For example, a signal for forming a triangular wave is generated. The transmit wave generation unit 10 is comprised of such an oscillator as VCO (Voltage Control Oscillator).

The transmit and receive select switch 20 is a switch which switches the transmission and reception of the antenna 31 based on a transmit and receive switching control signal SWT. As FIG. 1 shows, the transmit and receive select switch 20 is comprised of two switches: a transmit system switch 21 and a receive system switch 22.

In other words, when the antenna 31 functions as a transmit antenna, the transmit system switch 21 turns ON so that an output signal from the transmit wave generation unit 10 is output to the antenna 31 via an amplifier 11, and the receive system switch 22 turns OFF so that a receive signal received on a receive wave by the antenna 31 is not output to the antenna select switch 40 via amplifiers 34 and 36.

When the antenna 31 functions as a receive antenna, the receive system switch 22 turns ON so that a receive signal on the receive wave received by the antenna 31 is output to the antenna select switch 40 via the amplifiers 34 and 36, and the transmit system switch 21 turns OFF so that an output signal from the transmit wave generation unit 10 is not output to the antenna 31.

The transmit and receive switching control signal SWT is output from the control unit 90. For example, the transmit and receive switching control signal SWT is input to the transmit system switch 21, and to an inversion circuit, which is installed in a previous stage of the receive system switch 22, an inverted transmit and receive switching control signal SWT is input, so as to implement the above mentioned switching control.

The antenna 31 serves as both a transmit antenna and a receive antenna. As a transmit antenna, the antenna 31 outputs a transmit wave based on the output signal, which is output from the transmit and receive select switch 20. As a receive antenna, the antenna 31 receives a reflected wave, which is reflected by a target, and outputs an output signal based on this reflected wave. The antennas 32 and 33 are receive antennas. The configuration is the same as the antenna 31 when used as a receive antenna.

The antenna select switch 40 has three switches: 41, 42 and 43, and switches the receive signals from the antennas 31, 32 and 33 based on the antenna switching control signals SW0, SW1 and SW2.

In other words, in the antenna select switch 40, the ON and OFF of each switch 41, 42 and 43 are controlled based on each antenna switching control signal SW0, SW1 and SW2, and the output of the output signal from each antenna 31, 32 and 33 to the mixer 50 is switched.

The antenna switching control signals SW0, SW1 and SW2 are output from the control unit 90.

The mixer 50 combines the output signal from the antenna select switch 40 and the output signal from the transmit wave generation unit 10. The composite signal is output to the output select switch 60.

The output select switch 60 outputs an output signal from the mixer 50 to the first ADC 70 or the second ADC 71 based on the output switching control signal of the control unit 90.

The first and the second ADCs 70 and 71 convert an output signal from the output select switch 60 into a digital signal.

The first and second FFTs 80 and 81 perform Fourier transform on digital signals from the first and second ADCs 70 and 71 respectively.

The output signal after Fourier transform from the first and second FFTs 80 and 81 are input to the control unit 90. Based on the output signals, the control unit 90 detects the power, frequency, etc. of the receive wave received by the antennas 31, 32 and 33, and detects the azimuth, distance, velocity, etc. of the target.

Now the receive operation of the radar apparatus 1 will be described with reference to FIGS. 2A to 2C.

Figure 2A:
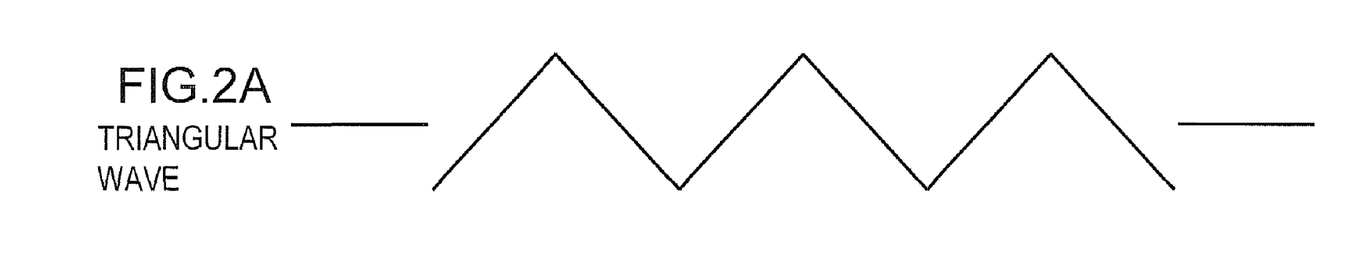
FIG. 2A shows an example of a received triangular wave.
Figure 2B:
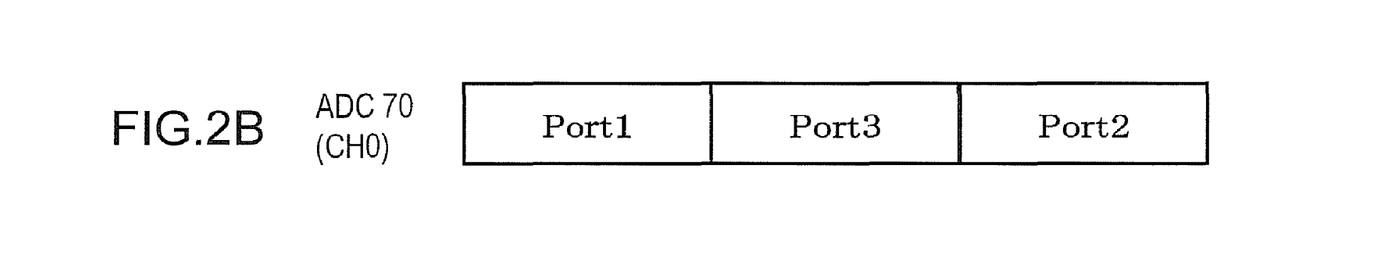
FIG. 2B and FIG. 2C show an example of the receive timing of each antenna.
Figure 2C:
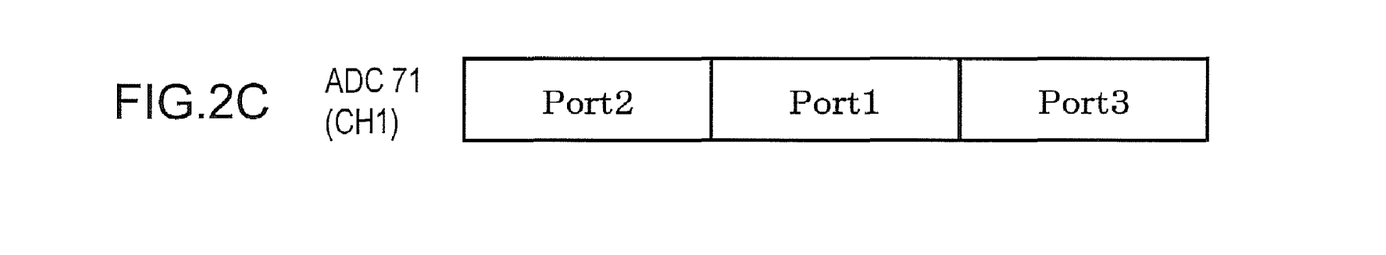

FIG. 2A is an example of a receive wave received by the antennas 31, 32 and 33. This radar apparatus 1 receives this receive wave, which is a triangular wave, by any two of the antennas 31, 32 and 33. For example, as FIG. 2B and FIG. 2C show, the reflected wave is received by the antenna 31 (port 1) and antenna 32 (port 2) in the first repeat cycle of the received triangular wave. In the next cycle, the wave is received by the antenna 33 (port 3) and antenna 31. And in the next cycle, the wave is received by the antenna 32 and 33. The wave is received by repeating these steps.

In the case of this example, each select switch 20, 40 and 60 operates as follows.

First, in the transmit and receive select switch 20, the receive system switch 22 is turned ON by the transmit and receive switching control signal SWT, and the path of the transmit system from the antenna 31 is formed. As FIG. 2B shows, a signal from the antenna 31 is input to the first ADC 70 in the first repeat cycle, so the switch 41 of the antenna select switch 40 turns ON, and the output select switch 60 is switched to the first ADC 70 side. Also as FIG. 2C shows, a signal from the antenna 32 is input to the second ADC 71, so the switch 42 of the antenna select switch 40 turns ON, and the output select switch 60 is switched to the second ADC 71 side.

Actually, in the first cycle, the two switches 41 and 42 are alternately switched so that the signals from the antenna 31 and antenna 32 are output to the mixer 50, and the output select switch 60 is also alternately switched according to the switching timing. In the next cycle as well, a similar switching operation is performed.

FIGS. 3A to 3D are diagrams depicting operation waveforms of a receive wave at normal time and at failure time. When the transmit block is "HIGH", a predetermined transmit wave is transmitted from the antenna 31 (see FIG. 3A), and when the receive block is "HIGH", a receive wave reflected from a target is received by the antennas 31, 32 and 33 (see FIG. 3B).

Figure 3A:
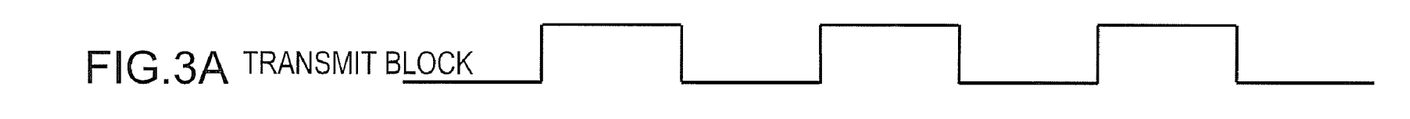
FIG. 3A shows an example of a transmission block.
Figure 3B:
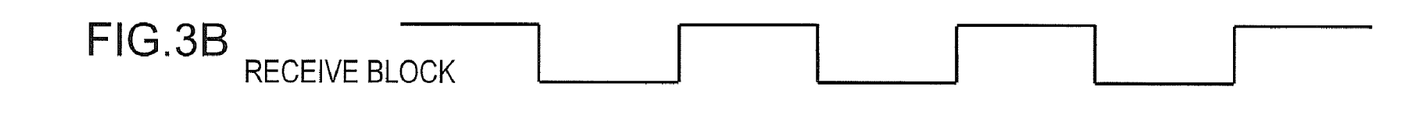
FIG. 3B shows an example of a receive block.
Figure 3C:
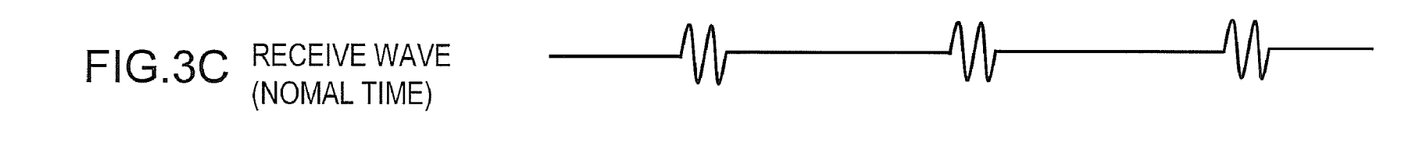
FIG. 3C shows an example of a receive wave at normal time.
Figure 3D:
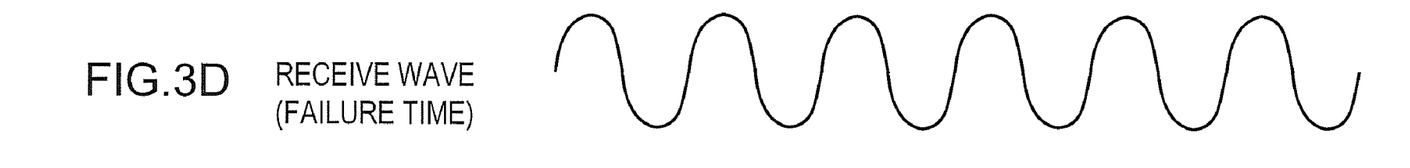
FIG. 3D shows an example of a receive wave at failure time.

At normal time, a predetermined receive waveform is acquired when the receive block is "HIGH", as shown in FIG. 3C. When the transmit and receive select switch 20 fails, on the other hand, a receive wave is received even when the receive block is not "HIGH", and the receive wave of which level is higher than the level of the receive wave received at normal time is acquired, as shown in FIG. 3D. The level of the receive wave at failure time is higher than the level at normal time because the receive level of the receive wave from a distant target is low, and the level of the receive wave received due to a failure of the transmit and receive select switch 20 inside the radar apparatus 1 is high.

Figure 4A:
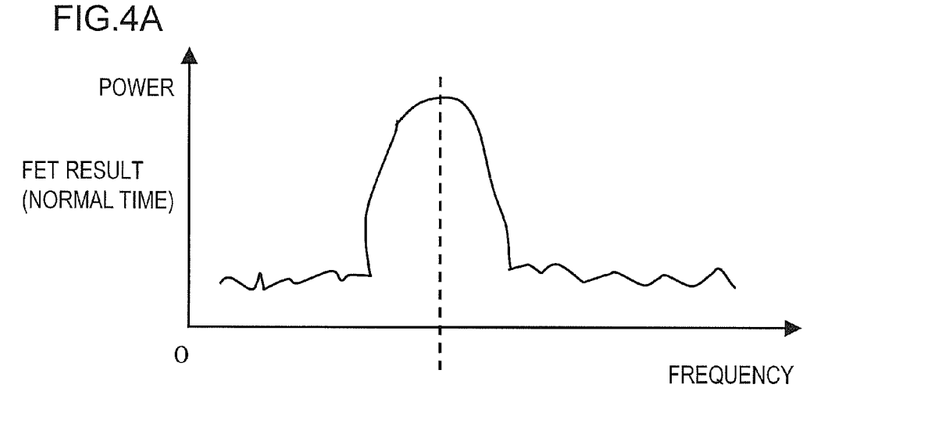
FIG. 4A shows an example of a waveform when Fourier transform is performed on a receive signal at normal time.
Figure 4B:
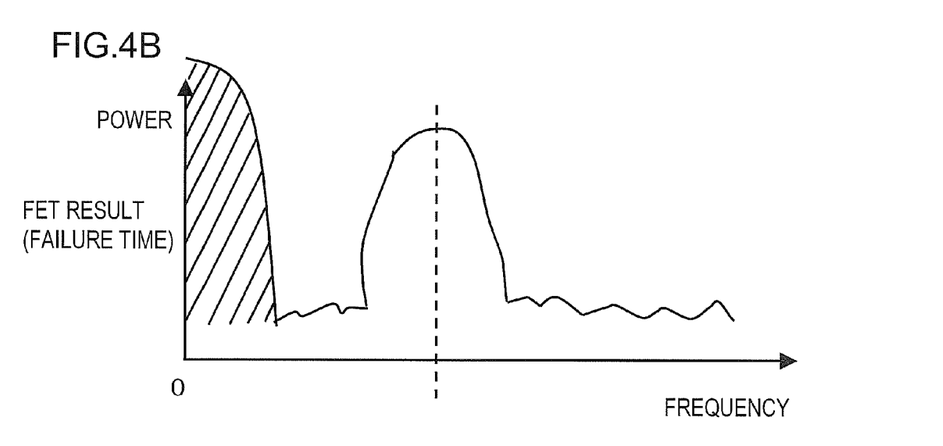
FIG. 4B shows an example of a waveform when Fourier transform is performed on a receive signal at failure time.

The receive signal at normal time and the receive signal at failure time are Fourier-transformed respectively, then the waveform diagrams shown in FIG. 4A and FIG. 4B are acquired. In FIGS. 4A and 4B, the lateral axis is frequency and the vertical axis is power. As FIG. 4A shows, the power of the receive wave is the highest at the center frequency at normal time. By detecting this center frequency, the azimuth, distance, velocity etc. of the target can be detected.

At failure time, on the other hand, high power is acquired at around the DC component with frequency "0", as shown in FIG. 4B. This is because the distance is closer than the target because of an internal failure of the radar apparatus 1, and an internal path signal is superimposed on the signal of the receive wave due to the failure, which makes power high.

The waveforms shown in FIGS. 4A and 4B are acquired by the control unit 90 of this radar apparatus 1, for example, and at normal time, the azimuth and other values of the object can be acquired by detecting the center frequency in the control unit 90.

Figure 5:
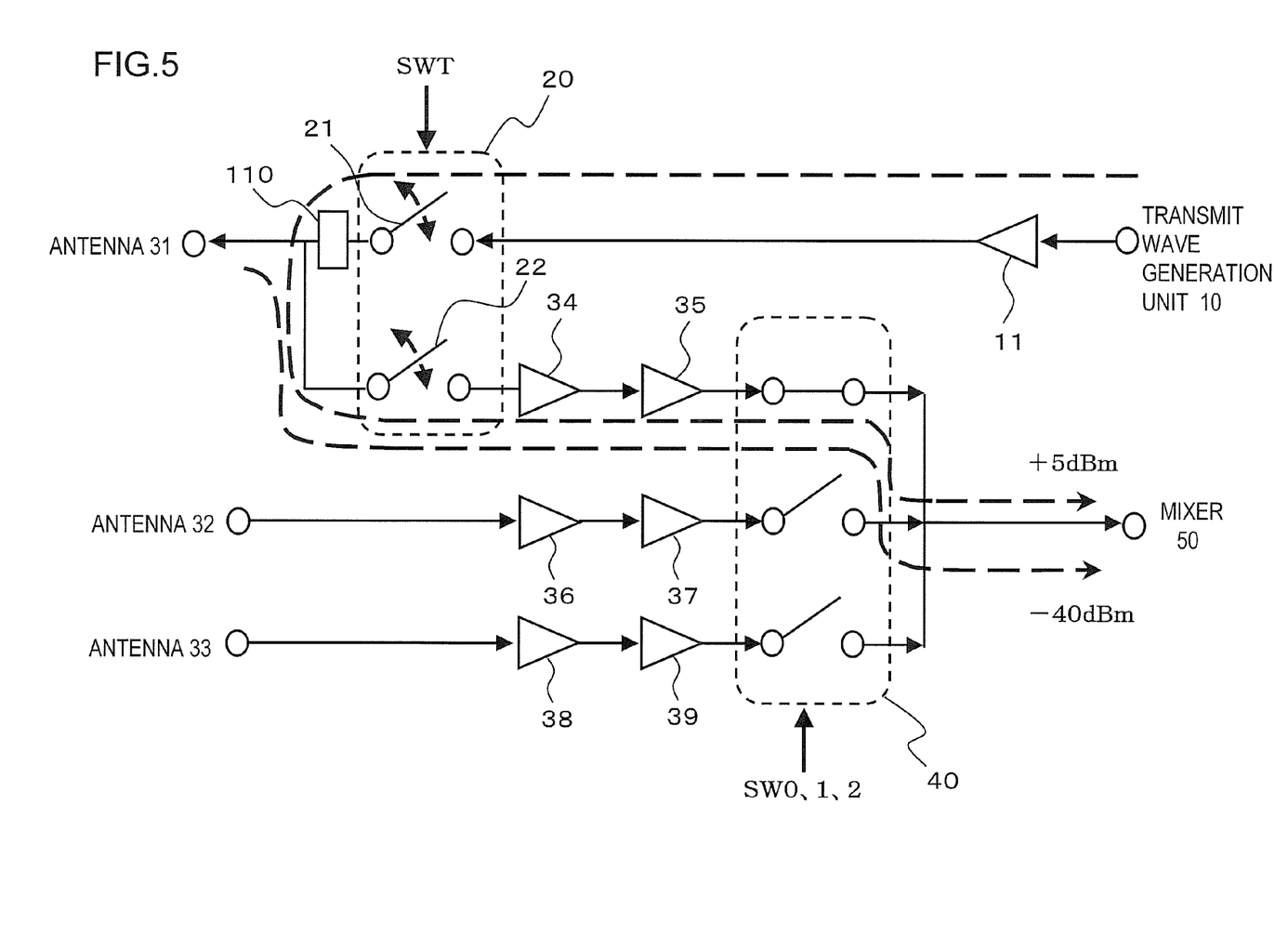
FIG. 5 is a diagram depicting a power generated near a transmit and receive select switch.

FIG. 5 is a diagram depicting the power generated near the switch 20 when the transmit and receive select switch 20 fails.

A signal for generating a transmit wave, which is output from the transmit wave generation unit 10, is supposed to be output from the antenna 31 at normal time. If the transmit and receive select switch 20 fails, however, both switches 21 and 22 turn ON, and high power is received from the antenna 31 to the mixer 50. AS FIG. 5 shows, power as high as "+5 dBm", for example, wraps around. This is because an internal path signal (signal of a DC component) is superimposed due to failure of the transmit and receive select switch 20.

Power to be input to the mixer 50, when the transmit and receive select switch 20 is normal, is about "−40 dBm" at the maximum. Therefore whether the transmit and receive select switch 20 fails or not can be judged by this value "−40 dBm". In other words, it can be judged that the transmit and receive select switch 20 fails when power higher than "−40 dBm" is input to the mixer 50. When the receive power is "−40 dBm" or less, it can be judged that the transmit and receive select switch 20 is operating normally.

Therefore the control unit 90 can judge whether the transmission and reception select switch 20 is operating normally or not depending on whether a receive power equivalent to the power value "−40 dBm" is detected or not. This power value "−40 dBm" is set as a threshold (e.g. is stored in a memory as a threshold). The control unit 90 measures the power of the receive signals which are output from the first and second FFTs 80 and 81, and judges whether the transmit and receive select switch 20 fails depending on whether this value exceeds the threshold. It is judged that the switch 20 fails if this value exceeds the threshold, and that the switch 20 is normal if the value is within the threshold.

When the transmit and receive select switch 20 fails, high power, "+5 dBm", for example, is generated near the mixer 50, as shown in FIG. 5, so if the control unit 90 measures the receive power, a power value exceeding the threshold is acquired.

In this way, the failure of the transmit and receive select switch 20 is diagnosed by a threshold, without adding any new circuits, so a failure can be diagnosed at low cost. Also the threshold is not set by using radio waves in space, but by using a maximum value of receive power inside the radar apparatus 1, which is measured in advance, so a detection error or non-detection does not occur, and high precision failure diagnosis can be performed.

When it is judged that the transmit and receive select switch 20 fails, the control unit 90 performs such processing as stopping the operation of the entire radar apparatus 1.

In the present embodiment, a value of the receive power, "−40 dBm", is merely an example, and a value corresponding to another power value may be used as a threshold. In this case as well, a functional effect similar to the above example can be exhibited.

In the above example, the transmit and receive select switch 20 is installed for the antenna 31, but the transmit and receive select switch 20 may be installed for the antennas 31, 32 and 33 respectively, for example. In this case, the control unit 90 detects failure of this switch 20 using OR of the detected result on each of the transmit and receive select switch 20. The control unit 90 judges it as failure if receive power for one of the transmit and receive select switches 20 exceeds the threshold. In this case as well, a functional effect similar to the above example is exhibited.

A gain control unit 110 (see, FIG. 5) may be formed in an output stage of the transmission system of the transmit and receive select switch 20, so that only if the receive power exceeding the threshold is still acquired even if the gain of the output signal from this switch 20 is decreased, for example, the control unit 90 judges that this switch 20 fails. By performing failure diagnosis in two steps, detection error and non-detection can be decreased, and accuracy can be further increased.

In the above example, the transmit and receive waves are transmitted and received by the three antennas 31, 32 and 33, but a target may be detected by four or more antennas. Also the transmit and receive select switch 20 may be installed in each antenna. In any of these cases, a functional effect similar to the above example can be exhibited.

Figure 6:
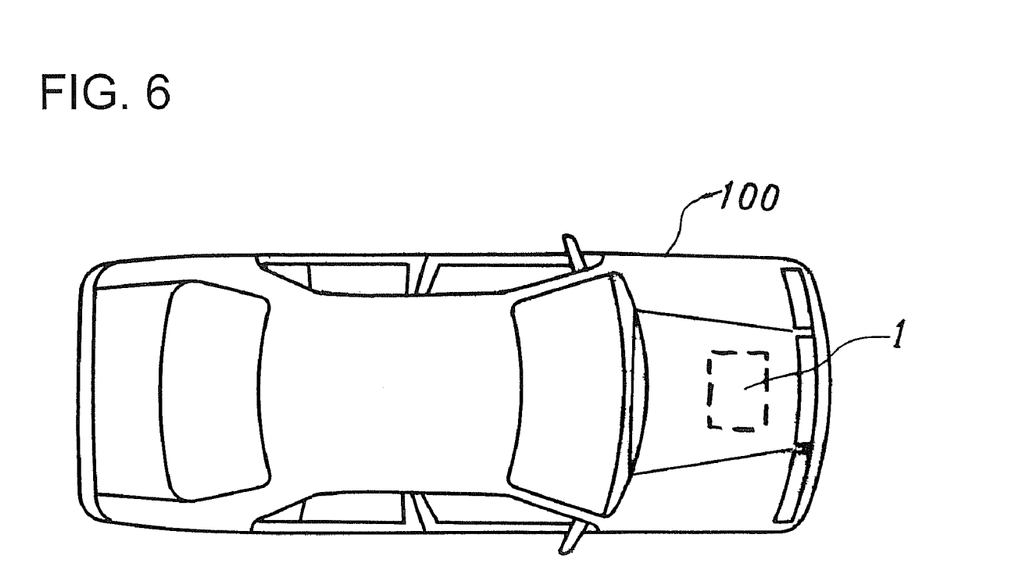
FIG. 6 is a diagram depicting an example when the radar apparatus is mounted in a vehicle.

FIG. 6 shows an example of the case when the radar apparatus 1 is mounted in a vehicle 100. In this case as well, a functional effect similar to the above example can be exhibited. In the example in FIG. 6, the radar apparatus 1 is mounted at approximately the center front of the vehicle 100, but needless to say, the radar apparatus 1 may be mounted at any position of the vehicle 100.

What is claimed is:

1. A radar apparatus having a transmit and receive antenna which serves as both a transmit antenna for transmitting a transmit wave into space and a receive antenna for receiving a reflected wave of said transmit wave reflected on a target, comprising:
    a transmit and receive switching unit which switches transmission and reception of said transmit and receive antenna, and
    a failure detection unit which judges that said transmit and receive switching unit fails when a power value of a receive signal received by said transmit and receive antenna is greater than a threshold.

2. The radar apparatus according to claim 1, wherein when there are a plurality of said transmit and receive antennas and said transmit and receive switching unit is installed in each of said plurality of transmission and reception antennas, said failure detection unit judges that said transmit and receive switching unit fails when a power value of said receive signal received by one of said transmit and receive antennas is greater than said threshold.

3. The radar apparatus according to claim 1, further comprising a gain control unit which controls a gain of said receive signal output from said transmit and receive switching unit, between said transmit and receive switching unit and said failure detection unit, wherein said failure detection unit judges that said transmit and receive switching unit fails when a power value of said receive signal of which gain is controlled by said gain control unit is greater than said threshold.

4. The radar apparatus according to claim 2, further comprising a gain control unit which controls a gain of said receive signal output from said transmit and receive switching unit, between said transmit and receive switching unit and said failure detection unit, wherein said failure detection unit judges that said transmit and receive switching unit fails when a power value of said receive signal of which gain is controlled by said gain control unit is greater than said threshold.

5. A failure detection method in a radar apparatus having a transmit and receive antenna which serves as both a transmit antenna for transmitting a transmit wave into space and a receive antenna for receiving a reflected wave of said transmit wave reflected on a target, the method comprising the step of:

judging that a transmit and receive switching unit which switches transmission and reception of said transmit and receive antenna fails when a power value of a receive signal received by said transmit and receive antenna is greater than a threshold.

\* \* \* \* \*